E. P. NOYES.
FLUID PRESSURE VALVE.
APPLICATION FILED FEB. 26, 1910.

1,013,213.

Patented Jan. 2, 1912.
2 SHEETS—SHEET 1.

Witnesses:
G. Blake
W. R. Schulz

Inventor:
E. P. Noyes
by Robert M. Pierson, atty

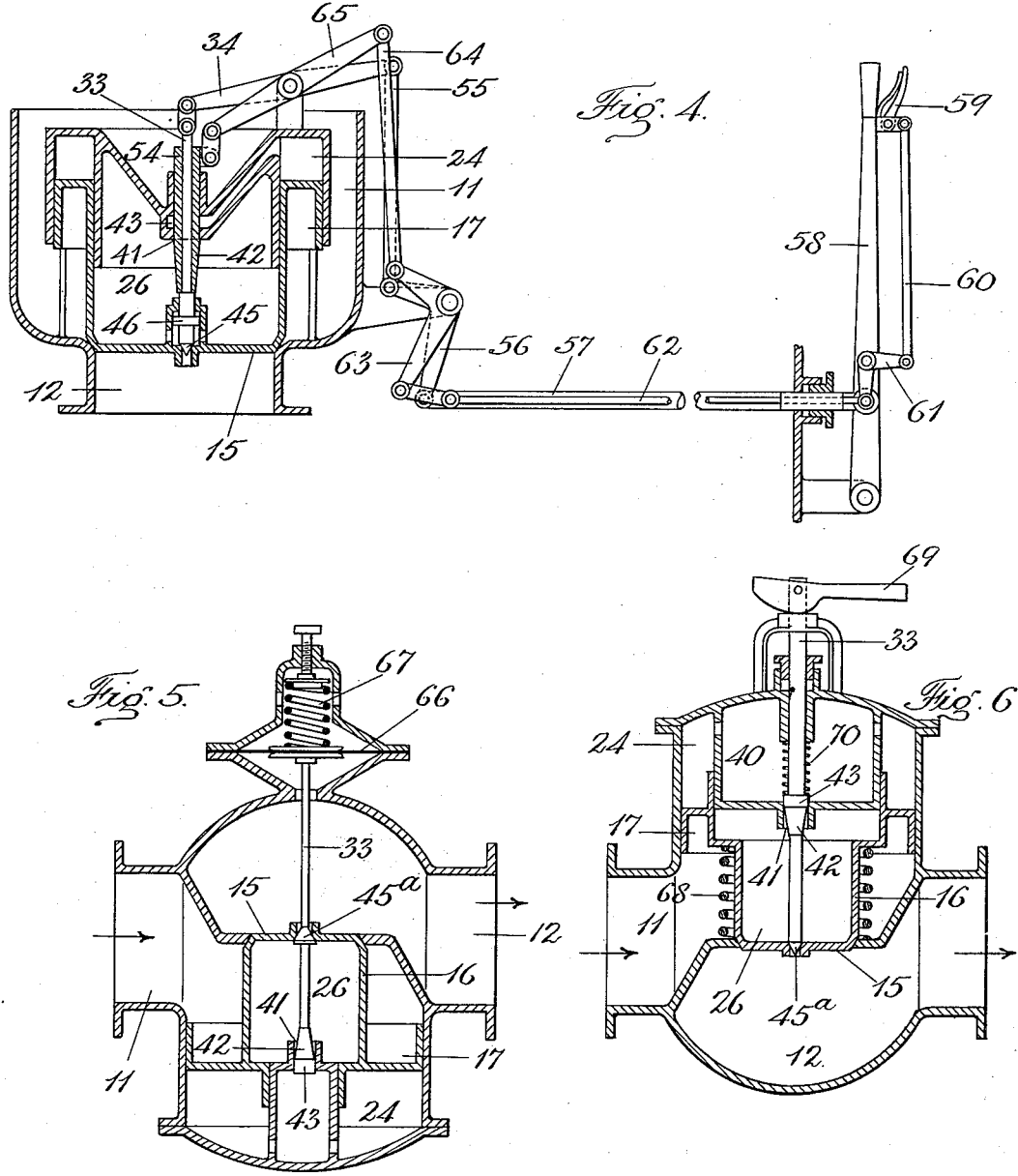

UNITED STATES PATENT OFFICE.

EDWARD P. NOYES, OF WINCHESTER, MASSACHUSETTS, ASSIGNOR, BY MESNE ASSIGNMENTS, TO C. P. POWER COMPANY, OF NEWARK, NEW JERSEY, A CORPORATION OF NEW JERSEY.

FLUID-PRESSURE VALVE.

1,013,213.   Specification of Letters Patent.   Patented Jan. 2, 1912.

Application filed February 26, 1910. Serial No. 546,133.

*To all whom it may concern:*

Be it known that I, EDWARD P. NOYES, a citizen of the United States, residing at Winchester, in the county of Middlesex and State of Massachusetts, have invented certain new and useful Improvements in Fluid-Pressure Valves, of which the following is a specification.

This invention, which relates to fluid-controlling valves having a motor piston, consists in certain improvements in the style of valve illustrated in my copending application, Serial No. 431,723, or in related kinds of valve apparatus, said prior valve having among its features a telescopic connection between the moving valve-and-piston member and the casing, whereby the main valve can be substantially balanced as to the posterior pressure, together with separate chambers for containing this posterior pressure and a controlling pressure intermediate between the anterior and posterior pressures, and a suitable pilot valve or valves for controlling the pressures in said chamber or chambers and regulating the movements of the main valve.

My present invention has among its objects the simplification, and improvement in other respects, of the pilot-valve and mechanical controlling arrangements, their special adaptation to large valves, the creation of new and useful relations of fluid flow and pressure between the intermediate and balancing chambers and between the latter and the posterior chamber, the attainment of certain desirable under-balancing or overbalancing effects, and the combination of these two and other effects in one structure.

Figure 1:
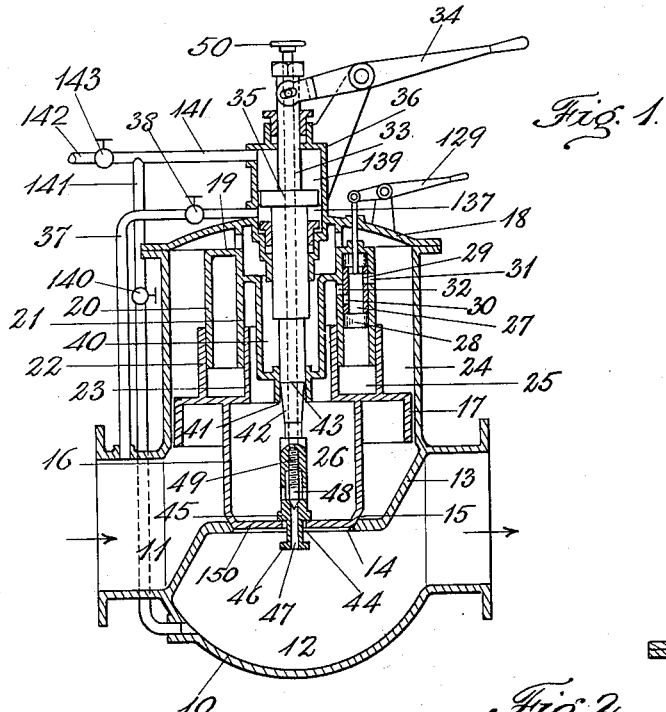
Figure 2:
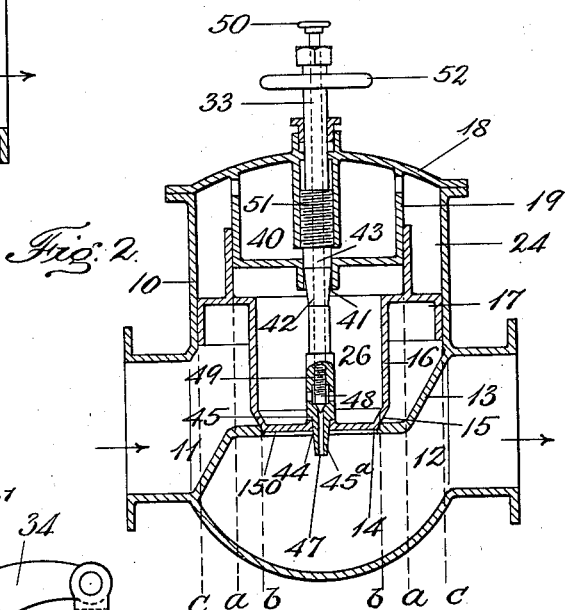
Figure 3:
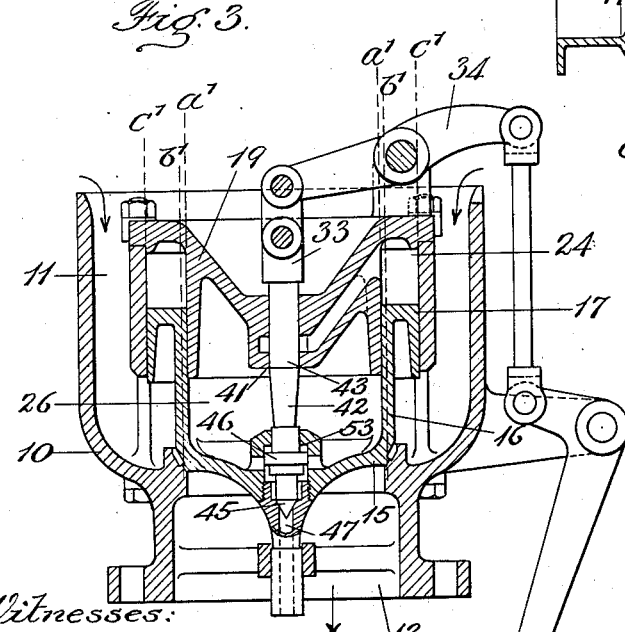

In the accompanying drawings, of which the several views illustrate vertical sections, Figure 1 represents a combination valve constructed according to my invention and adapted for different modes of operation. Fig. 2 shows a simplified embodiment on the "underbalance" plan. Fig. 3 represents an "overbalanced" valve. Fig. 4 represents a modified mode of constructing and operating the pilot-valve and stem mechanism. Fig. 5 represents a mode of automatically controlling the pilot-valve stem in a valve of the overbalanced type by the posterior pressure acting on a diaphragm. Fig. 6 represents an embodiment of the underbalanced type adapted for quick operation of the pilot-valve stem followed by a gradual closing traverse of the main valve.

Referring at first to Fig. 1, which shows in one structure the combination of both underbalancing and overbalancing features together with a device adapted to alternate the two modes of operation, or to merge them, or to act as a primary controller, 10 indicates the valve-casing having anterior and posterior pressure chambers 11, 12 adapted for connection with the corresponding sections of the fluid line, and a separating partition 13 containing the port 14 which connects said chambers and is controlled by the main valve 15, the latter being part of a moving piece 16 which carries the operating piston 17 subject on its lower side to the anterior pressure in chamber 11. Piston 17 is non-seating, and hence the effective outer diameter of its lower surface is the same in both the open and closed positions of valve 15. The casing cover 18 is formed with a stationary depending hollow flange or guide-bearing 19 whose outer and inner walls 20, 21 make a telescopic connection with outer and inner flanges 22, 23 on the moving piece 16, whereby there are formed two concentric chambers 24, 25 above the piston 17, and a central chamber 26 above the floor or web 150 of valve 15. 27 is an axially-movable distributing valve operating in a cylinder 28 in the guide-bearing 19 and worked by an external lever 129, for connecting the chamber 25 with either or both of the chambers 24, 26, said valve having ports 29, 30 adapted to move reciprocally into and out of register with corresponding ports 31, 32 in its cylinder-wall. 33 is an axially-movable controlling stem adapted to be worked by an external lever 34 and also shown with an operating piston 35 working in a cylinder 36, said cylinder being provided with suitable pipes and valves in order that fluid-pressure may be brought to bear upon said piston. This is of particular value in large valves where the forces are of considerable magnitude even on a pilot-valve stem, and it also enables said stem to be conveniently controlled from a distance, as where the main apparatus is placed underground. I have shown a pipe 37 leading from the chamber 11 to the cylinder-space 137 below piston 35 and provided with a stop-valve 38 whereby anterior pressure may be admitted to said cylinder-space, said pressure serving to raise the stem 33 when the pressure in cylinder-space 139 above the piston is sufficiently relieved. The upper area of piston 35 is shown as larger than its lower area, and said piston has preferably a leaky fit in its cylinder which will equalize the fluid pressures on opposite sides of it, and cause stem 33 to descend, if the chamber 139 has been closed, or substantially closed. This may be done by means of a stop-valve 140 in a discharge pipe 141 leading from chamber 139 to the posterior chamber 12. When said stop-valve is opened sufficiently, and there is the requisite pressure-difference between chambers 11 and 12, the pressure may be dropped in chamber 139 far enough to cause stem 33 to rise, or this pressure-drop may be effected in any event by leading the discharge off to a low-pressure locality through a branch 142 having stop-valve 143. Said branch would also be capable of use in another capacity, to lead a foreign pressure into the chamber 139. A central chamber 40 in the casing-cover is in open communication with chamber 24, and a port 41 connects it with the chamber 26, said port being controlled by a tapered valve 42 and by the superjacent cylindrical or piston portion 43 of the controlling stem 33, which snugly fits the port 41. 44 is a port in the web of valve 15, connecting the chamber 26 with the posterior chamber 12, and 45, 46 are shoulders or flanges on the controlling stem between which the web of the main valve may have some free motion, these shoulders being intended for mechanical actuation of the moving piece 16 through the controlling stem 33, while the upper one 45 is also capable of acting as a pilot valve for the port 44 and as a sealing valve to shut said port when the main valve is closed. 47 is another port connecting chambers 26 and 12, but formed in the lower end of stem 33 and controlled by a pilot rider-valve 48 having a screw-connection at 49 with the controlling stem, and an external operating-knob 50.

My invention consists partly in a particular mode of arranging an unbalancing area or areas on the moving piece 16 so as to either "underbalance" or "overbalance" the main valve, the latter being regarded as underbalanced when, standing either in a closed or a partly-open position, it has a tendency (neglecting weight and friction) to move away from its seat when pressures are equalized in chambers 11 and 24 on the one hand and in chambers 12 and 26 on the other hand, and overbalanced when it has a tendency to close against its seat under these circumstances. In order to give a better understanding of this feature I will first describe the separate underbalanced and overbalanced types. Fig. 2 represents the former, and in this embodiment it will be noted that the effective diameter $a\ a$ of the chamber 26 exceeds the diameter of the seating circle $b\ b$ of the valve 15 by an annulus $a\ b$ which is subject on its lower side to the anterior pressure in chamber 11 and on its upper side to the pressure in chamber 26. In this case the lower extremity of the controlling stem 33 is shown as a flat-seated valve 45 having a tapered extension 45$^a$ and said stem has a screw connection at 51 with the casing-cover 18 and an external operating-knob 52. Preferably the sliding surfaces of the moving piece 16 in this as well as the other embodiments of my invention, are without packing, and the relative diameters of the piston 17 and its cylinder are such that a restricted inflow opening exists past said piston into the controlling chamber 24. The loose fit of this piston is represented in Fig. 1, somewhat exaggerated, and will be understood as applicable to the other views—or any other well-known mode of establishing an inleakage may be used. The outlet from chamber 24 to chamber 26 is controlled by the pilot valve-members 42, 43 on stem 33 and the outlet from chamber 26 to chamber 12 is controlled by the pilot valves 45 and 48. Thus it will be seen that a shunt flow from the anterior chamber 11 to the posterior chamber 12 may take place under pilot-valve control through the chambers 24 and 26, which are serially-related. Chamber 26 I term for convenience the "balancing" chamber, since it may be employed to balance the area of the main valve, or a substantial part of said area, as to posterior pressure, and chamber 24 I term the "controlling", "intermediate", or "intermediate-pressure" chamber, although the pressure in each chamber may vary from that anterior to the main valve 15 to that posterior to said valve.

Let it be assumed that the rider-valve 48 in Fig. 2 is closed and the controlling-stem 33 is screwed down as far as it will go, thus holding the main valve 15 to its seat by mechanical pressure and stopping all leakage-flow through the chambers 24, 26 to the posterior chamber 12. Anterior pressure will soon accumulate by leakage in chambers 24, 26 and aid in keeping the main valve seated. If now, the stem 33 be unscrewed far enough to open the valve 45 a substantial amount, but not to withdraw the piston portion 43 from port 41, the anterior pressure in chamber 24 will be retained, but the pressure in the balancing chamber 26 will drop to that in the posterior chamber 12. Hence, since the pressure on the under side of annulus $a\ b$ exceeds that on the upper side thereof, the moving piece 16 will be unbalanced and begin to rise and open the main valve 15. The area of annulus $a\ b$ which creates this unseating force may be anything desired and is independent of the diameter of the main valve, but in general this annular area will be relatively-small so as to impose a gentle opening force, readily controllable by the stem 33 without undue strain or wear on the latter. Being relatively small, if it were the only means providing a valve-opening force, the amount of throttling of the main flow at the maximum opening of main valve which the pressures on said annulus could establish, would be relatively-large, owing to the weight of the valve acting against this small net opening-force. Accordingly when the main valve has been partially opened by this means it is provided that the larger area $a\,c$ of piston 17, between the diameter $a\,a$ and the outer diameter $c\,c$ of said piston may be called into play by a further withdrawal of stem 33 so as to open the port 41 and partially relieve the pressure in chamber 24. This furnishes an additional lifting force, the amount of which may be regulated by using the tapered valve 42 to adjust the relation between the inflow to chamber 24 (past piston 17) and the outflow therefrom. Hence the main valve is opened wider, and as soon as the posterior pressure accumulates sufficiently in chamber 12 it begins to react on and check the outflow from the chamber 24. This would automatically bring the moving piece 16 to a position of stable equilibrium due to a resultant balance between the pressure differential and the weight of the moving piece, if the areas of $a\,c$ were acting alone, but since there remains a differential upward pressure on annulus $a\,b$, the moving piece tends to follow the stem 33, but with decreasing force as the main valve opens wider and the pressure in chambers 12 and 26 more nearly approaches that in chamber 11. Conversely, in closing the main valve, stem 33 is screwed in to close the port 41 and permit equilization of pressures in chambers 11 and 24, whereupon the valve may be easily pushed to its seat against the uplift on annulus $a\,b$ by a further screwing in of said stem. For this operation, actual contact between stem 33 and the moving piece 16 is not essential, because if the valve 45 has so restricted port 44 that the inflow by leakage into chamber 26 exceeds the outflow therefrom, the pressure quickly tends to accumulate over the whole floor of chamber 26 to such an extent as to close the main valve by fluid pressure slightly in advance of stem 33. The reverse of this occurrence will take place on opening the main valve and thus prevent an actual contact between it and the controlling stem.

For an elastic fluid such as steam it is desirable to have an outlet from chamber 26 whose size is not subject to the movements of the main valve, and this I provide in the port 47 controlled by rider valve 48 which may be operated to blow down the pressure in chamber 26 before the stem 33 is retracted to permit an opening of the main valve, and when the latter is being closed, its closure may be accomplished by shutting the rider valve 48 when stem 33 has been nearly but not fully screwed down. Its opening, so far as the said position of stem 33 will permit, may in like manner be effected by opening valve 48.

Fig. 3 represents a type of overbalanced valve constructed according to my invention and especially designed for use as a locomotive throttle-valve, the entire structure being adapted for inclosure in the steam space of the boiler. The features of this valve corresponding to parts already described in Figs. 1 and 2, bear the same reference characters as in those views. Here it will be seen that the diameter of the seating-circle $b'\,b'$ of the main valve 15 exceeds the diameter $a'\,a'$ of the balancing chamber 26 by an annulus $a'\,b'$ subject on its upper side to the pressure in chamber 24 and on its lower side to the posterior pressure in chamber 12. In other words the chamber 26, though capable of balancing a substantial part of the diameter of the main valve as to posterior pressure, does not completely balance the same and when pressures are equalized in the chambers 11 and 24 on the one hand, and the chambers 12 and 26 on the other hand, the main valve is held to its seat by reason of the excess of effective or projected area of piston 17 exposed to pressure in chamber 24 over that of the piece 16 exposed to pressure in chamber 11. The net downward pressure on annulus $a'\,b'$ tends to decrease as the opening of the main valve increases, for the posterior pressure then tends to build up and create an increasing upwardly-acting force on the lower side of this annulus. The resultant or differential force acting on the piston annulus $b'\,c'$ is the same in character as that acting on the annulus $a\,c$ in Fig. 2 and is under control of the pilot-valve members 42, 43 on the stem 33. In operation, assuming the main and pilot valves to be closed, the main valve is opened by first drawing up the stem 33 to open valve 45 and drop the pressure in chamber 26. The main valve is then mechanically lifted from its seat against the downwardly-acting pressure on annulus $a'\,b'$ by further upward movement of stem 33 causing the shoulder 46 on said stem to engage shoulder 53 on the moving piece 16. The continued upward movement of the controlling stem opens the port 41 and partially relieves the pressure in chamber 24, so that the main valve tends to complete its opening movement under the influence of the upwardly-acting pressure-differential on piston 17. In closing the main valve the reverse of these occurrences takes place, stem 33 being depressed by the lever 34 and its connections until port 41 is closed, whereupon the main valve, by reason of the net downward pressure on annulus $a'$ $b'$, tends to go to its seat under the mechanical restraint of stem 33, and valve 45 is thereafter closed by the final downward movement of the stem. The specific features of this form of my invention are claimed in a separate application, Serial No. 570,974.

The "seating circle" of the valve 15 in my present invention is regarded as the line of contact between the valve and its seat when this line is without substantial width. In a valve whose seating-surface is of substantial width the "seating circle" is the inner valve lip or smaller circle of said seating surface, which acts as the throttling lip when the valve stands partly open.

The pilot-valve and controlling-stem features of my invention are not confined to a valve of this general type having an unbalancing annulus. They apply as well to one which is made neutral by a substantial equality between the diameters of the main valve and of the chamber 26, as represented for example in Fig. 4, which is otherwise the same as Fig. 3 except that the pilot-valve members 42 and 43 are mounted on a sleeve 54 adapted for movement on the stem 33 independently of valve 45. In this case the lever 34 for actuating stem 33 is connected by a link 55, bell-crank 56, and rod 57, with a hand-lever 58 on which is pivoted an auxiliary hand-lever 59 connected by rod 60, bell-crank 61, rod 62, bell-crank 63, rod 64, and lever 65 with the sleeve 54. Lever 58 may be worked to operate the stem 33 and sleeve 54 as a unit, or, valve 45 having been opened, the sleeve 54 may be worked independently by means of auxiliary lever 59 to open and close the main valve 15 by pressure independently of the mechanical control exercised by stem 33. Obviously an equivalent arrangement of independently-movable pilot-valves for the outflow from chambers 24 and 26 respectively, might be applied to the constructions represented in Figs. 1 and 2, or either of them.

In Fig. 5 I have shown the stem 33 under control of a diaphragm 66 subject on its lower side to the posterior pressure of chamber 12, and on its upper side to the pressure of the atmosphere and of an adjustable spring 67. Here the main valve and casing are shown as inverted and the moving piece 16 is of the overbalanced type. The tendency of this arrangement is to automatically maintain a substantially constant pressure in the chamber 12 by reason of the control exerted by diaphragm 66 over the tapered valve 42.

In Fig. 6, showing a valve apparatus of the underbalanced type, the main valve is further predisposed to open by means of a spring 68; and the stem 33, which has a quick-operating cam-lever 69, is predisposed to close by reason of the downward pressure of a spring 70 acting on said stem. A device of this kind is adapted for use as a flushing valve capable of a quick opening and slow closure. On raising stem 33 to relieve the pressure in chamber 26, the valve 15 tends to open quickly both because of its underbalance and because of the spring 68, but when stem 33 is again depressed, the accumulation of a pressure in chambers 24 and 26 sufficient to overcome the spring 68 and close the main valve, will be comparatively slow.

Reverting to Fig. 1 which shows the combination in one structure of both the underbalanced and the overbalanced types by the introduction of the balance-shifting chamber 25 with its appurtenances, it will now be understood that this apparatus may be placed in an underbalanced condition by raising the distributing valve 27 until ports 30 and 32 coincide so as to throw the chamber 25 into full communication with chamber 26. The moving piece 16 may then be controlled and operated by means of the stem 33 alone, or by means of it and the rider-valve 48 as described in connection with Fig. 2. To realize the overbalanced condition, valve 27 is depressed to the position shown in Fig. 1 so as to register the ports 29, 31 and place chamber 25 in free communication with chamber 24. The apparatus may then be operated substantially as described in connection with Fig. 3. The substantial equivalent of a neutral or exactly-balanced type may be realized by moving the valve 27 to an intermediate position in which chamber 25 is in restricted communication with both chambers 24 and 26 and contains a pressure intermediate between those of the two chambers. In either of these modes of operation it is apparent that stem 33, instead of being operated mechanically, may be controlled by fluid pressure acting on the piston 35, as already described, and that said piston and its appurtenances might be used in connection with other forms of my invention, such as the forms in Figs. 2 and 3 for example. Since suitable movements of valve 27 will, as described, make the main valve tend either to close or to open, and with any degree of graded forces depending upon the character of said movements and the pressure levels of the resulting mean pressures in chamber 25, the main valve may be controlled over substantially its full stroke in either direction by valve 27.

I claim,—

1. In valve apparatus, the combination of a casing having anterior and posterior chambers connected by a port, and a movable member having a main valve controlling said port and a non-seating motor piston subject on one side to the anterior pressure, said member and the casing forming an intermediate-pressure chamber and a balancing chamber of which the former has an inlet from the anterior chamber and an outlet to the balancing chamber and the latter has an outlet to the posterior chamber, together with pilot valves for controlling said outlets.

2. In valve apparatus, the combination of a casing having anterior and posterior chambers connected by a port, a movable member forming with said casing an intermediate chamber having an inlet from the anterior chamber and a balancing chamber having an inlet from the intermediate chamber, said member having a main valve controlling said port and a non-seating motor piston interposed between the anterior and intermediate chambers, said member being also formed with an outlet from the balancing chamber to the posterior chamber, a pilot valve controlling said outlet, and means for controlling the relation between the size of said inlets to the intermediate and balancing chambers.

3. In valve apparatus, the combination of a casing having anterior and posterior chambers connected by a port, a movable member telescopically connected with the casing and forming therewith intermediate and balancing chambers serially related with each other and in shunt between said anterior and posterior chambers, said member having a main valve controlling said port and a motor piston subject on opposite sides to the pressures in said anterior and intermediate chambers, a pilot valve controlling the passage between said intermediate and balancing chambers, a second pilot valve coaxial with the first, controlling the passage from the balancing chamber to the posterior chamber and adapted to seat on said movable member, and means extending through a single aperture in the wall of said casing for operating both pilot valves.

4. In valve apparatus, the combination of a casing having anterior and posterior chambers connected by a port, a movable member having a telescopic connection with said casing and forming with the casing an intermediate chamber which surrounds the telescopic connection and has an inlet from the anterior chamber, and a balancing chamber having an inlet from the intermediate chamber, and an outlet to the posterior chamber through the web of the movable member, said member having a main valve controlling said port and a motor piston interposed between the anterior and intermediate chambers, and a pilot stem formed with two valves, one of which seats on the movable member to seal said outlet, and the other of which controls the inlet to the balancing chamber, and a piston portion formed on said stem adjacent to the second-said pilot valve for permitting the latter to remain closed while the first-said pilot valve is operated.

5. In valve apparatus, the combination of a casing having anterior and posterior chambers connected by a port, a movable member forming with said casing an intermediate chamber in shunt between said anterior and posterior chambers, and having a main valve controlling said port and a piston interposed between the anterior and intermediate chambers, said casing being formed with an outlet from the intermediate chamber, and a controlling stem adapted to positively actuate said member and having a lost-motion connection therewith and also provided with a pilot valve controlling said outlet.

6. In valve apparatus, the combination of a casing having anterior and posterior chambers connected by a port, a movable member forming with the casing intermediate and balancing chambers in series with each other in the order named and the two in shunt between the anterior and posterior chambers, said balancing chamber being provided with two outlets to said posterior chamber, one of which is formed in the movable member, a pilot valve controlling the outlet so formed, a second pilot valve controlling the other outlet independently of the movable member, and a main valve carried by said member and controlling the aforesaid port.

7. In valve apparatus, the combination of a casing having anterior and posterior chambers connected by a port, a movable member forming with said casing intermediate and balancing chambers in shunt between said anterior and posterior chambers, said member having a main valve controlling said port and a motor piston interposed between the anterior and intermediate chambers, means for controlling the relation between the inflow to and the outflow from the intermediate chamber, a stem for mechanically operating said member and adapted to permit independent movement thereof, said stem formed with an outlet from the balancing chamber to the posterior chamber unaffected by the movements of said member, and a rider-valve carried by said stem and adjustable thereon from outside the casing to control said outlet.

8. In valve apparatus, the combination of a casing having anterior and posterior chambers connected by a port, a movable member having a telescopic connection with the casing and a main valve controlling said port, the relative diameters of which are such as to provide an unbalancing annulus on the movable member effective in the partly-open positions of said valve, said member and casing forming an intermediate chamber surrounding said connection and in shunt between the anterior and posterior chambers, and said member having a nonseating motor piston interposed between said anterior and intermediate chambers, and means for controlling the relation between the inflow to and the outflow from said intermediate chamber.

9. In valve apparatus, the combination of a casing having anterior and posterior chambers connected by a port, a movable member telescopically connected with said casing and forming therewith an intermediate chamber surrounding the telescopic connection and in shunt between the anterior and posterior chambers, said member having a main valve controlling said port and a motor piston interposed between the anterior and intermediate chambers, the effective area of the piston adjacent to the intermediate chamber being smaller than the effective area of said member adjacent to the anterior chamber, and means for controlling the relation between the inflow to and the outflow from said intermediate chamber.

10. Valve apparatus comprising a casing having anterior and posterior chambers connected by a port, a movable member telescopically connected with said casing and forming therewith an intermediate chamber surrounding the telescopic connection and having a restricted inlet from the anterior chamber, and a balancing chamber having an inlet from the intermediate chamber and an outlet to the posterior chamber, said member provided with a main valve controlling said port and a motor piston interposed between the anterior and intermediate chambers, the effective area of the piston exposed to intermediate pressure being smaller than the effective area of said member exposed to anterior pressure, and two pilot valves controlling respectively the inlet to and the outlet from said balancing chamber.

11. Valve apparatus comprising a casing having anterior and posterior chambers connected by a port, a movable member provided with a single-seating valve which closes said port in the direction of flow therethrough, and a motor piston exposed on one side to the anterior pressure tending to open the valve, a telescopic connection between said casing and said movable member surrounded by an intermediate chamber on the opposite side of the piston from said anterior chamber and having a restricted inlet therefrom, said casing and moving member also forming a balancing chamber of larger diameter than that of the valve and provided with an inlet from the intermediate chamber, and an outlet to the posterior chamber through the web of the movable member, and a stem carrying a pilot valve which controls the inlet from the intermediate to the balancing chamber and also carrying a second pilot valve adapted to seat on the web of the movable member to hold the main valve closed and seal the outlet from the balancing chamber to the posterior chamber.

12. Valve apparatus comprising a casing having anterior and posterior chambers connected by a port, and a guide member, a movable member telescoping with said guide member and forming with the casing an intermediate chamber having an inlet from the anterior chamber, and a balancing chamber having an inlet from the intermediate chamber through a passage within said guide member, said movable member provided with a main valve controlling said port, a web located between the balancing chamber and the posterior chamber and formed with a port connecting the two, and a motor piston interposed between the anterior and intermediate chambers and having an effective area exposed to the latter, smaller than the effective area of the movable member exposed to anterior pressure, and a pilot stem formed with a valve controlling said passage within the guide, an adjacent piston portion adapted to enter and close said passage, and a second pilot valve adapted to seat upon said web to close the port therein and hold the main valve closed.

13. Valve apparatus comprising a casing having anterior and posterior chambers connected by a port, a movable member telescopically connected with the casing and forming therewith an intermediate chamber surrounding the telescopic connection and in shunt between the anterior and posterior chambers, and a balancing chamber, said member having a valve controlling said port and a motor piston interposed between the anterior and intermediate chambers, the motor areas of said member being such that the latter tends to move in one direction when pressures are equalized in the anterior and intermediate chambers on the one hand and the balancing and posterior chambers on the other hand, a controlling stem adapted to mechanically move said member in the opposite direction but permitting free movement thereof, and means for controlling the relation between the inflow to and the outflow from said intermediate chamber.

14. Valve apparatus comprising a casing having anterior and posterior chambers connected by a port, a movable member having a valve controlling said port and a motor piston exposed on its valve-opening side to the anterior pressure, said casing and movable member forming two chambers on the valve-closing side of said member, and a central chamber adapted to contain posterior pressure, one of the said two chambers being intermediate between the anterior and posterior chambers and having means for controlling the relation between its inflow and outflow, and the other having means for connecting it either with said intermediate chamber or said central chamber.

15. Valve apparatus comprising a casing having anterior and posterior chambers connected by a port, a movable member having a valve controlling said port and forming with the casing three chambers on the valve-closing side of said member, adapted to derive their pressure from the anterior chamber, and means for connecting one of said three chambers at will with either of the other two.

16. Valve apparatus comprising a casing having anterior and posterior chambers connected by a port, a movable member having a valve controlling said port and forming with the casing two serially-related chambers in shunt between the anterior and posterior chambers and a third chamber, all three on the valve-closing side of said member, and a distributing-valve adapted to reciprocally open and close ports connecting said third chamber respectively with the two serially-related chambers.

17. Valve apparatus comprising a casing having a piston cylinder and two guide-bearings, and provided with anterior and posterior chambers connected by a port, a movable member having a main valve controlling said port and a motor piston mounted in said cylinder and exposed to anterior pressure on its valve-opening side, said member being telescopically connected with said guide-bearings and forming with the casing a central chamber adapted to contain posterior pressure, an intermediate chamber the diameter of whose inner bearing exceeds the main-valve diameter, and a balance-shifting chamber the diameter of whose inner bearing is less than the main-valve diameter, means for controlling the relation between the inflow to and the outflow from said intermediate chamber, and a distributing valve adapted to place said balancing chamber in free communication with either the intermediate chamber or the central chamber, or in restricted communication with both.

18. Valve apparatus comprising a casing having anterior and posterior chambers connected by a port, a movable member provided with a valve controlling said port and with a motor piston subject on one side to the anterior pressure tending to open said valve, said member forming with the casing three chambers adapted to contain pressures tending to close the valve, two of said chambers being serially connected and in shunt between the anterior and posterior chambers, means for controlling the relation between the inflow to and the outflow from the first of said serially-connected chambers, means for controlling the outflow from the second one thereof to the posterior chamber, and means for placing the third chamber in free communication with either of said serially-connected chambers.

19. Valve apparatus comprising a casing having anterior and posterior chambers connected by a port, a main valve controlling said port, a pilot-valve controlling said main valve and having an operating piston, a cylinder having chambers located on opposite sides of said piston and connected by a restricted passage, and ducts connecting said cylinder chambers respectively with said anterior and posterior chambers and provided with stop-valves.

In testimony whereof I have hereunto set my hand in the presence of two subscribing witnesses, this twenty-fourth day of February 1910.

EDWARD P. NOYES.

Witnesses:
RICHARD A. NOYES,
E. BATCHELDER.